3,574,594
PHENYLACETONITRILES AS PRE-EMERGENCE HERBICIDES
Stanley T. D. Gough, Raritan, and Roger P. Napier, Piscataway, N.J., assignors to Mobil Oil Corporation
No Drawing. Filed Apr. 29, 1968, Ser. No. 725,173
Int. Cl. A01n 9/20; C07c 121/68
U.S. Cl. 71—105                                    3 Claims

ABSTRACT OF THE DISCLOSURE

Phenylacetonitriles having trifluoromethyl or cyano ring substitutents are effective in pre-emergence control of undesirable grasses.

BACKGROUND OF THE INVENTION

Field of the invention

This invention is directed to pre-emergence herbicides. It is more particularly concerned with the use of certain phenylacetonitriles for the control of plant growth.

DESCRIPTION OF THE PRIOR ART

As is well known to those familiar with the art, good crop yields are dependent on control of undesirable plant life which would otherwise compete with crop plants for moisture, nutrients, light, and the like. An effective and desirable method for achieving such control is by using chemicals which kill or inhibit the growth of undesirable plants without doing serious damage to the crop plants. Various substituted phenylacetonitriles have been proposed as herbicides, but have varied in their effect depending upon the type of substituent. Insofar as is now known, trifluoromethyl- and cyano-substituted derivatives have not been used for the control of plant growth.

SUMMARY OF THE INVENTION

This invention provides a method for the pre-emergence control of undesirable plants that comprises applying to soil containing seeds of said undesirable plants a composition containing an active ingredient having the formula:

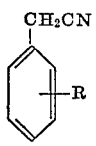

wherein R is trifluoromethyl or cyano, said active ingredient being applied in an amount sufficient to effect pre-emergence herbicidal control of said undesirable plants.

DESCRIPTION OF SPECIFIC EMBODIMENTS

The following examples demonstrate typical methods of preparing the pre-emergence herbicides contemplated herein.

Example 1

A solution of 72 g. of sodium cyanide in 65 ml. of water and 185 ml. of 95% aqueous ethanol was treated with 244 g. of m-trifluoromethylbenzyl chloride. The resulting solution was heated under reflux for 6 hours and was then cooled. After most of the alcohol had been removed under vacuum, the residue was treated with 250 ml. of water and the black oily, lower layer was separated, washed with water, and dried over anhydrous magnesium sulfate. The m-trifluoromethylphenylacetonitrile was distilled under vacuum, and the fraction boiling at about 107–110° C. at a pressure of about 11 mm. of mercury was collected.

Example 2 o-Cyanobenzyl bromide (Fuson, J. Am. Chem. Soc., 1926, 48,834) (32.0 g.) and potassium cyanide (13 g.) in ethanol (250 ml.) and water (50 ml.) were gradually brought to the boiling point. A vigorous reaction then occurred. After 45 minutes refluxing most of the ethanol was removed and the residue was poured into ice-water, the green solid formed was dissolved in chloroform, dried (Na$_2$SO$_4$), and passed through alumina. The solvent was removed and the residue, o-cyanophenylacetonitrile, crystallized twice from methanol to give white needles, M.P. 79–80° (12.4 g.).

In carrying out the method of this invention for controlling plant growth the herbicides can be applied in various ways. They can be applied per se, but they are usually applied as the toxic components in herbicidal compositions, comprising a growth-controlling amount of the herbicide and a carrier for the herbicide. Compositions can be applied as dust, as liquid sprays or as gas-propelled sprays. In addition to the carrier, they can contain additives such as emulsifying agents, wetting agents, binding agents, gases compressed to the liquid state, odorants, and stabilizers. Liquid and solid carriers known as carriers for herbicides include water, organic solvents, mineral oils, clays, and ground walnut shells.

The exact quantity of the compounds of this invention to be utilized in herbicidal compositions, as is well known to those skilled in the art, will be found to vary rather widely. It depends to some extent on the type of the composition in which the material is being employed, the method of application, the nature of the condition to be controlled, and other commonly encountered factors. In practice, herbicidal application is measured in terms of pounds of herbicides applied per acre. The compounds of this invention are effective when applied in growth-controlling amounts, i.e., in rates between about 2 pounds and about 10 pounds per acre. As used herein, the term "soil" is inclusive of any substance in which plants grow or can grow, including earth, sand, and decayed plant and animal matter.

HERBICIDE TESTS

Pre- and post-emergence herbicide tests method of propagating test species

Crabgrass—*Digitaria sanguinalis*
Yellow foxtail grass—*Setaria glauca*
Johnson grass—*Sorghum halepense*
Barnyard grass—*Echinochlos crus-galli*
Amaranth pigweed—*Amaranthus retroflexus*
Turnip—*Brassica sp.*
Cotton—*Gossypium hirsutum* var. DPL smooth leaf
Corn—*Zea Mays*
Bean—*Phaseolus vulgaris* var. Black Valentine All crop and weed species were planted individually in 3″ plastic pots containing potting soil. Four seeds each of corn, cotton, and snapbeans were seeded to a depth equal to the diameter of the seed. All other species are surface seeded and sprinkled with soil in an amount sufficient to cover the seed. Immediately after planting, all pots were watered by sub-irrigation in greenhouse trays. Pots for the pre-emergence phase were seeded one day before treatment.

Planting dates for the post-emergence phase were varied so that all seedlings would reach the desired stage of development simultaneously. The proper stage of seedling development for treatment in the post-emergence phase is as follows:

Grasses—2″ in height.
Pigweed and turnips—1 or 2 true leaves above visible cotyledons.

Cotton—First true leaf 1″ in length, expanded cotyledons.

Corn—3″–4″ in height.
Bean—Primary leaves expanded, growing point at primary leaf nodes.

METHOD OF TREATMENT

Compounds were tested at rates of application equivalent to 8 pounds of actual compound per acre in a spray volume of 38 gallons per acre. Spray hood constants required to deliver the above volume are as follows:

Belt speed—2 m.p.h.
Air pressure—Adjusted to provide 38 gal./per acre delivery.
Nozzle tip—To provide uniform cross-section flat spray.

Formulations for spray applications were prepared in 50 ml. volumes with the following three components:
(1) 1.24 grams of compounds (8 lbs./acre rate).
(2) 49 ml. acetone or acetone-water combination.
(3) 1 ml. of Tween-20.

Spray applications were made in a hood containing a removable belt and fixed spray nozzle. For passage through the spray hood, one pot of each species (pre-emergence phase) was placed on the forward half of a wooden flat and one pot of established plants (post-emergence phase) was placed on the rear half of the flat. Treatments were removed to the greenhouse after spraying. Watering during the observation period was done only by sub-irrigation.

METHOD OF RECORDING RESULTS

Two weeks after treatment, pre- and post-emergent injury or control was visually rated, and the results were as shown in the following table. Injury is rated as dead (all plants killed), severe (plants usually did not recover), moderate (recovery but with reduced top growth), or slight (little or no damage).

The compounds of Examples 1 and 2 were subjected to the aforedescribed herbicide test. The results of pre-emergence and post-emergence tests at a dosage of 8 pounds per acre are set forth in the following table.

TABLE

| Plant | Pre-emergence | | Post-emergence | |
|---|---|---|---|---|
| | Example 1 | Example 2 | Example 1 | Example 2 |
| Corn | Slight | Slight | Slight | Slight. |
| Cotton | do | do | do | Moderate. |
| Bean | do | do | do | Slight. |
| Pigweed | Severe | Severe | do | Do. |
| Turnip | do | Moderate | Moderate | Do. |
| Yellow foxtail | Moderate | do | Slight | Do. |
| Crabgrass | do | Severe | do | Do. |
| Barnyard grass | Slight | Slight | do | Do. |
| Johnson grass | do | do | do | Do. |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:
1. A method for the pre-emergence control of undesirable plants that comprises applying to soil containing seeds of said undesirable plants a composition containing an active ingredient having the formula:

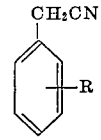

wherein R is selected from the group consisting of trifluoromethyl and cyano; said active ingredient being applied in an amount sufficient to effect pre-emergence herbicidal control of said undesirable plants.

2. The method defined in claim 1, wherein said active ingredient is m-trifluoromethylphenylacetonitrile.

3. The method defined in claim 1, wherein said active ingredient is o-cyanophenylacetonitrile.

References Cited

UNITED STATES PATENTS

| | | | |
|---|---|---|---|
| 3,465,051 | 9/1969 | Pecherer | X71—105 |
| 3,290,353 | 12/1966 | Battershell et al. | X71—105 |
| 3,489,784 | 1/1970 | Fellig et al. | 260—465 |

LEWIS GOTTS, Primary Examiner

C. L. MILLS, Assistant Examiner

U.S. Cl. X.R.

260—465